United States Patent [19]

Franklin

[11] 4,346,998
[45] Aug. 31, 1982

[54] BACKGROUND CORRECTOR FOR SPECTROCHEMICAL ANALYSES OF BIOLOGICAL SAMPLES

[75] Inventor: Michael L. Franklin, Parsippany, N.J.

[73] Assignee: Hoffmann-La Roche Inc., Nutley, N.J.

[21] Appl. No.: 68,239

[22] Filed: Aug. 20, 1979

Related U.S. Application Data

[63] Continuation of Ser. No. 741,814, Nov. 15, 1976, abandoned.

[51] Int. Cl.³ .......................... G01J 3/06; G01J 3/38; G01N 21/73
[52] U.S. Cl. ................................. 356/307; 356/308; 356/316; 356/328; 356/334
[58] Field of Search ............... 356/307, 308, 309, 315, 356/316, 323, 324, 328, 334

[56] References Cited

U.S. PATENT DOCUMENTS 3,588,252  6/1971  Habosian ........................... 356/307
3,743,425  7/1973  Jobe ................................... 356/307

FOREIGN PATENT DOCUMENTS 1798203  2/1972  Fed. Rep. of Germany.

OTHER PUBLICATIONS

"Computer-Controlled . . . Background Correction", Spillman et al., Analy. Chem.; vol. 48, #2; Feb. 1976, pp. 303-311.
"Rapid Scan Spectroscopy with a Refractor Plate as a Scanning Device"; Roldan, Rev. Sci. Inst., Nov. 69, 1388-1393.
Nordmeyer, Spectrochimica Acta, vol. 27B, pp. 377 to 383; Pergamon Press 1972.

Primary Examiner—Vincent P. McGraw
Attorney, Agent, or Firm—Jon S. Saxe; Bernard S. Leon

[57] ABSTRACT

There is disclosed herein a novel spectral background corrector system which, by employing light refracting techniques, causes wavelength scanning or modulation which allows substantial elimination of spectral background.

7 Claims, 10 Drawing Figures

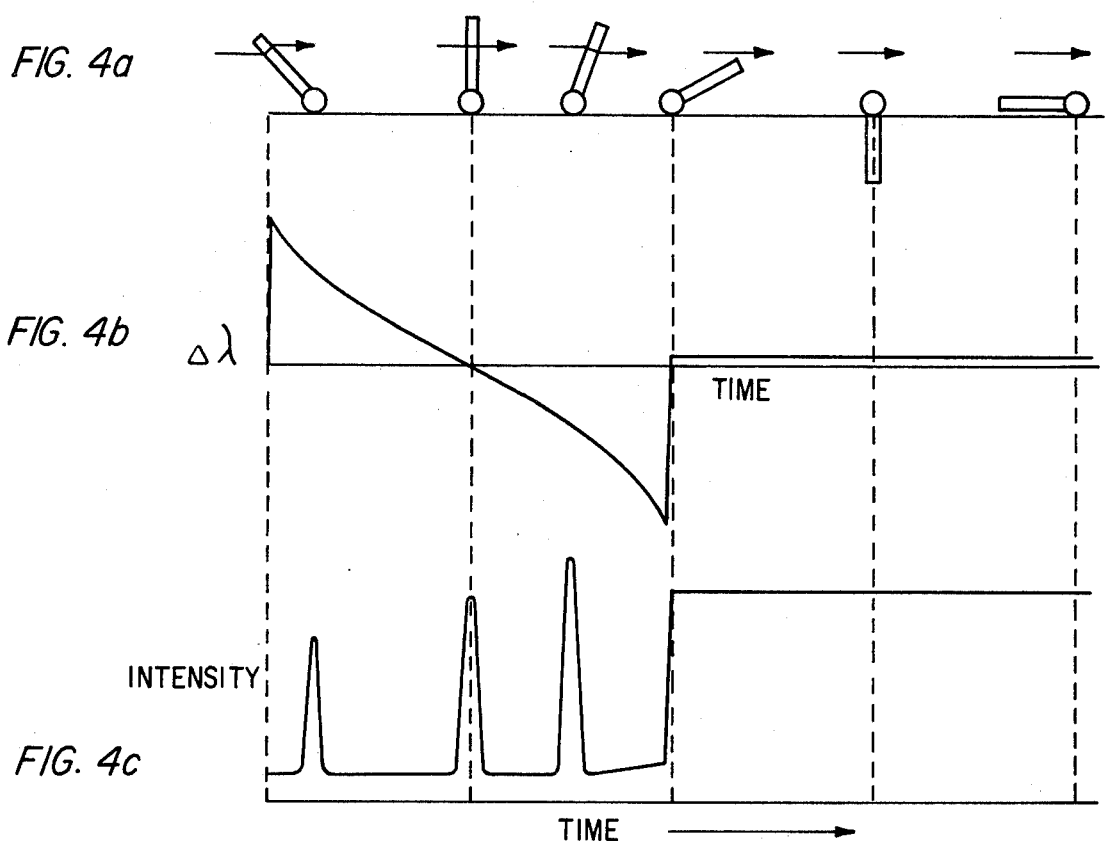
FIG. 4a
FIG. 4b
FIG. 4c
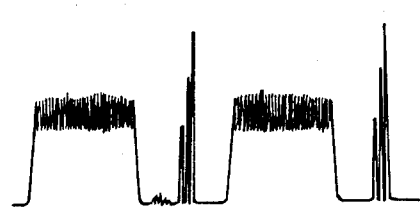
FIG. 5a
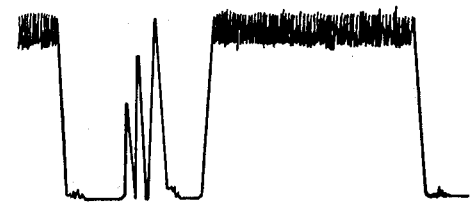
FIG. 5b
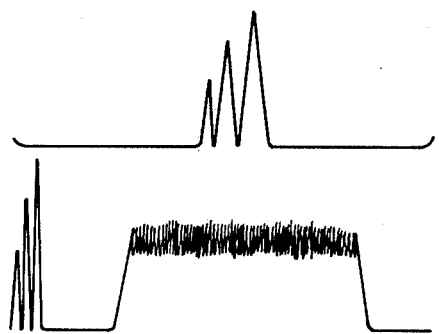
FIG. 6a
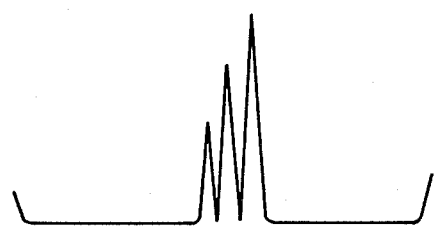
FIG. 6b

BACKGROUND CORRECTOR FOR SPECTROCHEMICAL ANALYSES OF BIOLOGICAL SAMPLES

This is a continuation, of application Ser. No. 741,814 filed Nov. 15, 1976, now abandoned.

BACKGROUND OF THE INVENTION

It is becoming increasingly important in health care programs to know the concentrations of biologically essential elements in normal subjects and to be able to accurately measure the smallest deviation that is significant with respect to disease. This is particularly true for elements known to be toxic. There have been and still are many problems associated with trace analyses. Chief among these problems are (a) the inability to accurately conduct multielement trace analyses, i.e., at the nanogram level, (b) the non-existence of systems and techniques which allow for rapid and economical trace metal analyses, (c) the inability to handle small sample sizes, (d) sample losses and contamination, and (e) spectral background, where spectrochemical techniques are employed. Many of the problems have been overcome by the use of inductively-coupled plasma techniques. See, for example, Knisely et al., *Clinical Chemistry*, Vol. 19, 8, pages 807–812 (1973) and Fassel et al., *Analytical Chemistry*, Vol. 46, 13, pages 1110A–1120A (1974). However, the problem of background interference remains from such sources of stray light as continuum plasma emission, molecular oxide band emission, near and far scatter, Rowland ghosts, etc., G. F. Larson et al., *Applied Spectroscopy*, 30, 384 (1976).

Several approaches to background correction have been used. Among the approaches employed have been (a) measuring the background emitted by a blank sample at each analytical line and using that value for correction, (b) movement of an alignment refractor plate behind the entrance slit of an emission spectrometer to permit the measurement of background just off each analytical wavelength with actual samples, (c) setting aside a specific readout channel on a spectrometer for background measurement at a selected wavelength, and (d) the use of photoelectric techniques to measure the background and the analytical line plus background simultaneously.

Among the earlier solutions to background correction, there have been proposed various optical scanning techniques, such as movement of the entrance or exit slits, or of the diffraction grating, or indeed movement of some means within the light beam itself, such as the above-referenced alignment refractor plate. Such prior art is represented for example by Snelleman et al., "Flame Emission Spectrometry with Repetitive Optical Scanning in the Derivative Mode," *Analytical Chemistry*, Vol. 42, No. 3, March 1970, pages 394–398. Here a refractor plate located near an entrance or exit slit is sinusoidally operated. A lock-in-amplifier is used to extract the wanted line emission signal from the unwanted varying spectral background. When the wavelength scan is sinusoidal and centered on the emission line of interest, only about 10 to 20% of the scan time is devoted to signal measurement. This type of wavelength modulation wastes desired signal integration time. Another reference teaching similar techniques is Visser et al., "A Device for Repetitive Scanning of a Spectral Line," *Applied Spectroscopy*, Vol. 30, No. 1, 1976, pages 72–73. In general it may be said of such prior art arrangements that the same provides sinusoidal type optical scans, which have the inherent disadvantage of providing the least amount of time for observation (i.e., the maximum rate of scan) at the point of maximum interest, i.e., at and proximate the wavelength associated to a spectral line of interest for a particular trace substance. Consequently, with a sinusoidal type scan only 10 to 20% of the total scan time is devoted to the spectrum portion of interest, whereas the remainder is concentrated in observing the background on either side of the wavelength of interest and relatively remote therefrom in terms of the necessity for accurate background correction relating to analysis of complex substances.

Another solution to the problem of background interference is that proposed by Gordon et al., *Applications of Newer Techniques of Analysis*, pages 39–42 (Plenum, New York, 1973). The Gordon et al. approach utilizes a two-position rotary refractor plate which is at all times in the path of the light beam. By stepping the refractor plate between the two positions, the emission line and the background on one side of the emission line respectively can alternately be measured. This approach is disadvantageous in that inter alia background information is obtained with regard to only one side of a spectral line and the "scan" is discontinuous, thus not presenting the true intensity situation at and proximate to the wavelength of interest. Another similar solution is proposed by Skogerboe et al., *Applied Spectroscopy*, Vol. 30, No. 5 (1976), pages 495–500. This approach utilizes an optical scan refractor plate mounted on a tuning fork such that the refractor plate can be moved in and out of the optical path in a "squarewave" mode. A principal disadvantage of this approach, again, is that because of the in and out movement of the refractor plate, only one portion of the background is observed, i.e., only one side of the spectral line is examinable. It is also necessary to correct for light transmission losses due to reflection and scattering when the refractor plate is in the optical path.

SUMMARY OF THE INVENTION

The instant invention provides to the clinical laboratory field, and to the analytical chemistry art as well, a background corrector system which enables one skilled in this art to correct for spectral background in spectrometric analyses. This background corrector system will be of great importance to those interested particularly in trace analyses of toxic metals and essential trace elements.

Typical biological samples that are analyzed most frequently are human tissues, blood sera or plasma, urine, saliva, or hair. These samples are usually analyzed to determine the presence of small amounts of manganese, chromium, lead, mercury, sodium, potassium, and calcium. The foregoing list of metals is by no means exhaustive. Those skilled in the art will immediately recognize the broad classes of metals to which this invention will be applicable.

If the samples to be analyzed are not already in liquid form, such as tissue or hair, etc., they may be solubilized by standard analytical techniques. These sample solutions are then placed in suitable containers from which an aliquot is taken and nebulized into fine droplets. These nebulized droplets are then entrained in argon gas and directed into an electrical flamelike discharge. It is at this point that plasma formation and spectrochemical excitation take place. The argon plasma is effected and sustained by inductively coupling a radio frequency discharge from a power supply of kilowatt size. The radio frequency may typically be about 24-45 MHz, and preferably about 30 MHz at generator inputs of 2-5 kw.

The sample mist is thus developed, vaporized and excited to atomic emission by the intense heat of the inductively coupled plasma. The inductively coupled plasma temperatures average about 9000° to 10,000° Kelvin. These intense heating conditions cause a thermal transmission of energy to the sample which in turn emits atomic radiation. This atomic radiation or emission is in the form of light in the uv and visible range. The atomic emissions possess spectral properties peculiar to the trace metals of interest.

This light radiation is collected by an optical system, such as lens (or mirror combination), and directed through the entrance slit of an atomic emission spectrometer. The light is then passed through the background corrector of this invention and directed toward a diffraction grating for analysis.

The analysis may be accomplished by passing the diffracted light through an exit slit. Operatively arranged behind the exit slit is a photodetector arrangement typically comprised of one or more photomultipliers. The photodetector converts the light to an electrical current and amplifies it, thus rendering the same into a suitable electrical signal form for subsequent handling. The electrical signal output of the detector is forwarded to a processor, preferably a minicomputer, and processed. The spectral data, which is presented as a wave form, may be reproduced graphically on a television console, cathode ray tube, etc. Photographs of the scan may be made if desired.

This invention provides in its broader aspects an emission spectrometer arrangement for determining the concentration of one or more trace elements of interest in a biological sample and having means providing dynamic background correction in connection with each wavelength of interest of the electromagnetic radiation spectrum, and providing the improvement comprising a variably movable alignment refraction means, positioned to predeterminably intercept electromagnetic radiation emissions of said sample for at least a portion of the time of movement thereof, for effecting measurement of emission intensity associated with at least one analytical wavelength $\lambda_0$ corresponding to a trace element of interest and over a predetermined range of wavelengths $\Delta\lambda$ on each side of $\lambda_0$ by way of a substantially continuous non-sinusoidal optical scan over said range.

This invention is particularly characterized in that the rate of scan is least at $\lambda_0$; moreover, the optical scan is repetitive and symmetrical about $\lambda_0$. Additionally, the optical scan is preferably non-linear over the wavelength range of interest, although it may be linear.

Another aspect of this invention is an emission spectrometer apparatus for predeterminably variably refracting electromagnetic radiation comprising a refracting medium positioned to receive incident electromagnetic radiation and means operatively connected to said refracting medium and controlling same for providing a substantially continuous, non-linear, non-sinusoidal variation in refraction of said incident radiation over a predetermined period of time in which the rate of variation in refraction is at a minimum at the midpoint of said period.

The aforementioned apparatus is comprised of a refracting plate mounted for repetitive rotation into and out of the beam, i.e., an off-axis refractor plate. The axis of rotation of this refractor plate is substantially perpendicular to the entrance slit axis and to the beam and proximate to the latter. The beam is intercepted during the rotation of the refractor plate preferably over a range of about 120°-140° of rotation. It is understood that lesser or greater ranges may be employed; the maximum range would, however, be limited to the degree of reflective light loss tolerable.

A further aspect of this invention is a spectrometer arrangement for determining the amount of one or more trace elements of interest in a biological sample, and having entrance slit means receiving a collected beam of electromagnetic radiation derived from the sample, diffraction grating means positioned to receive the beam from said entrance slit means, and at least one exit slit means predeterminably located to receive at least a portion of the electromagnetic radiation from said grating means which is associated to a particular range of wavelengths within the electromagnetic spectrum and for passing said radiation, having the improvement comprising first means arranged between the input of the entrance slit means and the output of the exit slit means for periodically intercepting said electromagnetic radiation to provide during each such period a substantially continuous, non-sinusoidal optical scan resulting in a corresponding shifting of the electromagnetic spectrum relative to the output of said exit slit means over said range of wavelengths, which range includes a wavelength $\lambda_0$ associated to a particular trace substance of interest, wherein said continuous shifting is at a minimum at $\lambda_0$.

The off-axis refractor plate is arranged such that during its rotation it will move repetitively in and out of the beam of light which has been collected from the atomic spectrochemical emissions of the sample and passed through the spectrometer entrance slit. The refractor plate is preferably made of quartz. This is because quartz is most suitable for use in both the ultraviolet and visible light regions. The refractor plate is off-axis with respect to the spectrometer optical axis. The spectrometer optical axis is defined by the path between the entrance slit and the diffraction grating.

The rotary motion means may be any conventional system that will impart, in accordance with the invention, a rotation to the quartz refractor plate suitably mounted in connection herewith. One effect a rotating refractor plate has is to in effect horizontally displace the entrance slit image perpendicular to the slit image plane. As the quartz plate rotates, the collected light beam is intercepted at varying angles thus effectively displacing the entrance slit image by differing amounts. The displacement referred to above occurs by virtue of light bending. The amount of light bending is related to the thickness of the refractor plate, the index of refraction of the material of the refractor plate and the instantaneous angle at which the refractor plate intercepts the light beam. This displacement may be expressed as follows:

$$D = t\left[1 - \left(\frac{\cos\theta}{\eta^2 - \sin^2\theta}\right)^{\frac{1}{2}}\right]\sin\theta$$

where D is the amount of displacement of the entrance slit image, t is the thickness of the refractor plate, $\theta$ is the angle defined by the direction of the beam incident on the refracting plate means and the normal to the plane of the refracting plate means, and $\eta$ is the refractive index of the refractor plate.

The background corrector system of this invention ranges from approximately $+\pi/2$ to $-\pi/2$ radians or $+80°$ to $-80°$. These values can be substituted in the above formula to determine the displacement of the entrance slit image. The amount of displacement of the entrance slit image can be translated into wavelength change (change in $\lambda$) by using the grating equation of a particular spectrometer. This equation may be expressed as $N\lambda = B(\sin I \pm \sin R)$, where N is an integer 0, 1, 2 ... (representative of the particular order of diffraction or the amount of spread providing by the grating)
$\lambda$ = wavelength
B = grating spacing
I = incident angle to grating
R = reflectance angle to grating.

An alternate means of approximating the wavelength change is by determining the product of the displacement and the reciprocal linear dispersion of the particular spectrometer used.

The amount of light bending is also a function of instrumental parameters, i.e., the particular atomic emission spectrometer used and the focal length of that instrument.

This displacement of the entrance slit image causes the angle of the entrance beam to change prior to striking the diffraction grating. It is this angular change in the light beam which causes a wavelength shift at the exit slit, after dispersion by the diffraction grating. Because of the angular change of light referred to above, the spectral background proximate (both sides) the spectral line of interest will also be allowed to pass through the exit slit, strike the photomultiplier, and be detected and read out.

BRIEF DESCRIPTION OF THE DRAWINGS

This invention may be more fully understood by reference to the accompanying drawings.

FIGS. 3-6 are graphical representations of wavelength-related scans of samples analyzed with instruments employing the novel background correcting techniques.

FIG. 4, in particular, illustrates the quartz plate at various points of rotation in and out of the light beam and the scan resulting therefrom in accordance with the invention.

DETAILED DESCRIPTION OF THE DRAWINGS

Figure 1:
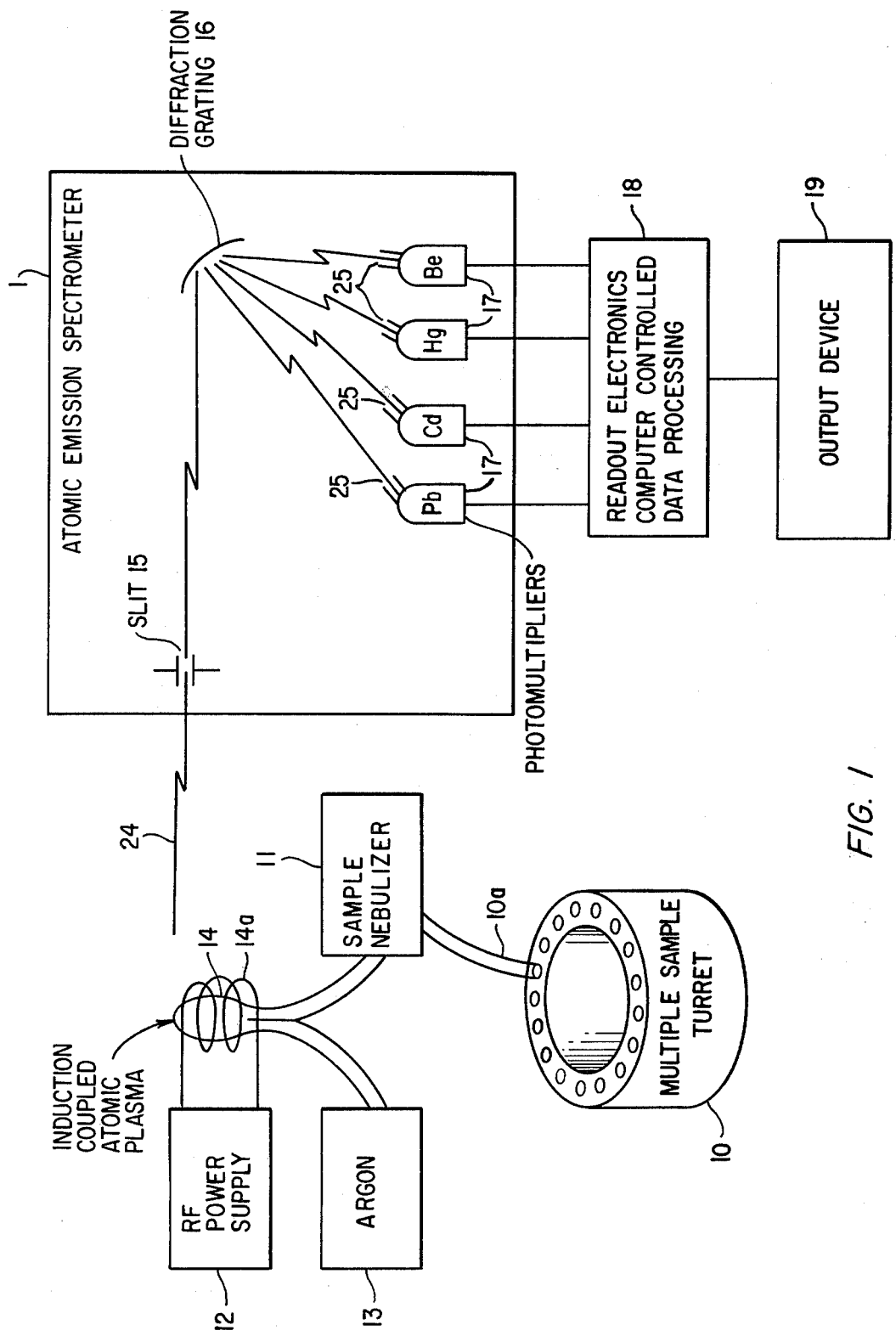
FIG. 1 schematically illustrates the analytical sequence involved in the trace metal analysis of a particular sample.

More specifically, a suitably prepared sample is placed into a multiple sample turret 10. A dip tube 10a sequentially selects and draws up some of the samples into the nebulizier 11. The sample is nebulized into fine droplets, entrained in argon obtained from an argon source 13 and directed into a quartz torch 14. This quartz torch 14 is surrounded by a coil of wire 14a through which is transmitted a radio frequency on the order of that mentioned hereinbefore.

The radio frequency causes inductive coupling of the energy to the sample entrained in argon gas. The inductive coupling of the atomic plasma actually takes place at the hottest part of the quartz torch (as indicated by the arrow). In the quartz torch the sample mist is desolvated, vaporized and excited to atomic emission at temperatures about 9,000°-10,000° Kelvin. The atomic emission is radiated from the inductively coupled plasma, collected by an optical system (see 21 in FIG. 2) and directed through entrance slit 15 of an atomic emission spectrometer. The slit image is displaced by the quartz refractor plate 23 and its associated apparatus 22. The light passes through the refractor plate to a diffraction grating 16, which disperses the light along a spectral curve where wavelengths of interest are isolated by exit slits 25 behind which are located photomultiplier detectors 17. The photocurrent generated by each photomultiplier detector is collected by a computer 18, processed and read out on an output device 19.

Figure 2:
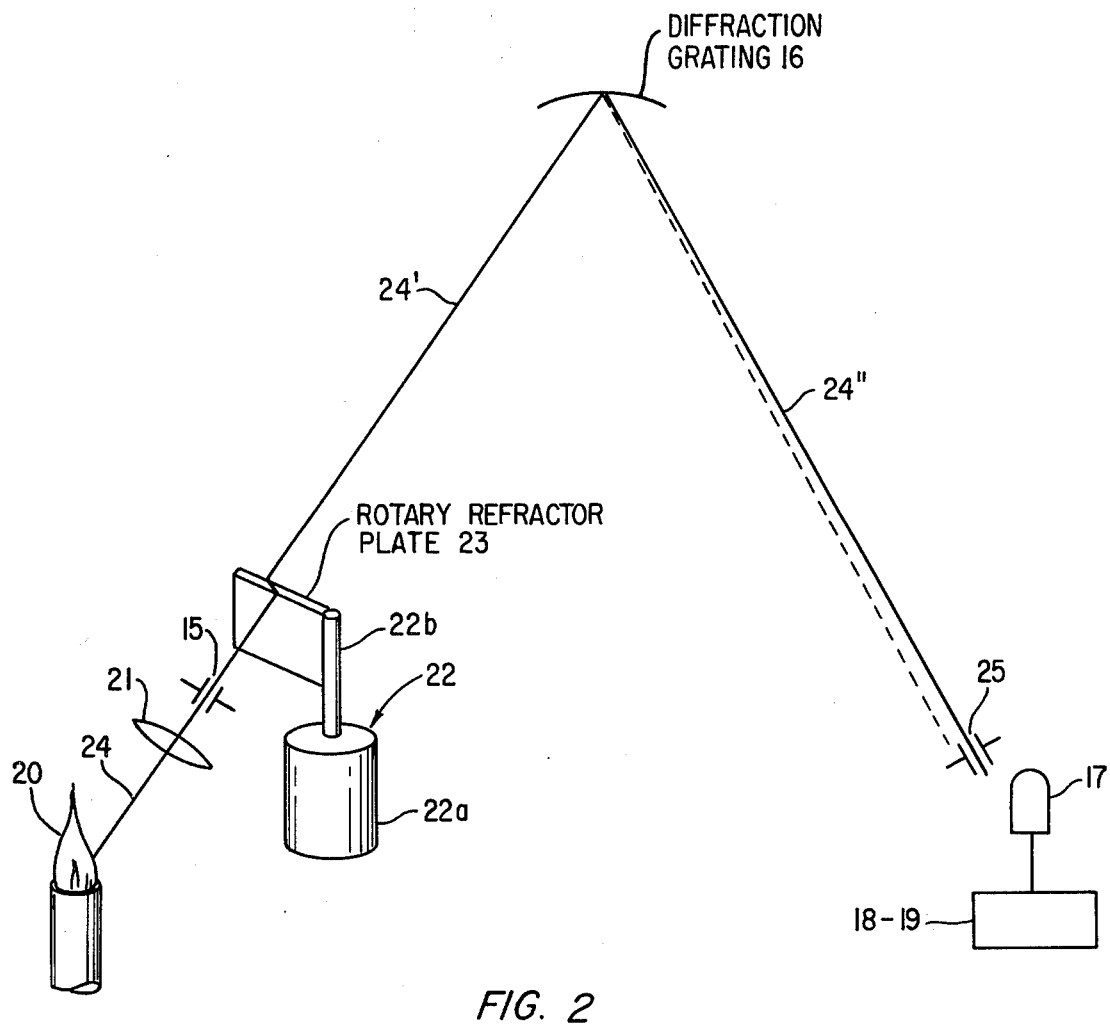
FIG. 2 schematically illustrates the displacement of a spectral line of interest and the background proximate thereto utilizing a background corrector in accordance with this invention.

Referring specifically to FIG. 2, the atomic emission from a spectral source 20 is passed through an optical collection system 21 (which may be a lens or a mirror combination) to the spectrometer via the entrance slit 15. Behind the entrance slit is located the means employed for spectral background correction according to this invention. It is comprised of a motive means 22a sufficient to impart a rotation of up to 400 cycles per second to a quartz plate 23 mounted on a shaft 22(b). As the refractor plate rotates, it will repetitively intercept the beam of light (atomic emission) emanating from the spectral source. This interception of the light beam will bring about light bending in the refractor plate as described. Depending upon the angle of interception of the incident beam 24, the entrance slit image 23 is alternately displaced horizontally in both directions on either side of the actual slit position. This slight displacement of the entrance slit image causes the angle of the incident beam 24 to change slightly (24') prior to striking the diffraction grating. The separate wavelengths are dispersed by the diffraction grating and isolated by the exit slit. The net effect of this displacement (beam 24") is that the spectral background adjacent a spectral line of interest will now pass through the exit slit 25 (as shown) and be detected separately in the photodetector 17 and read out (18-19).

It can readily be seen that some of the major problems associated with spectroscopy, i.e., spectral background noise and spectral line interference, can be effectively overcome when the novel background corrector of this invention is employed.

Figure 3:
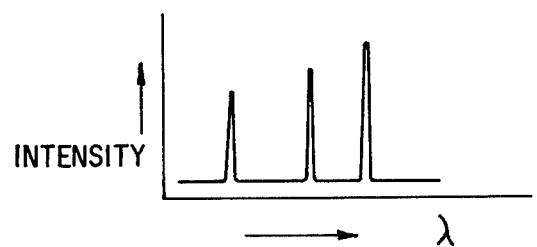

FIG. 3 is a scan of the manganese triplet showing signal intensity vs. wavelength. The center line is the emission line of interest for purposes of illustration. The remaining lines represent either spectral background or spectral line interference. The scan in FIG. 3 is typical of that obtained with existing monochromators.

FIG. 4, which is a preferred embodiment of this invention, sub-labeled A, B and C, respectively, illustrates the wavelength scan generated by the interception of the light beam caused by the rotating refractor plate. FIG. 4A illustrates the top view of a refractor plate angular position with respect to the entrance beam as a function of time. It can be seen that the refractor plate is in the beam of light for about half of its rotation. It can also be noted that at those points where the light is bent (depending upon the angular position of the refractor plate) the wavelengths due to background are separated and detected as separate wavelengths at differing times. The amount of displacement in wavelength over time is illustrated in FIG. 4B. The wavelength displacement presents an advantage in that as the spectral line of interest is approached, spectral resolution increases because the scan has slowed significantly. In other words, by slowing the scan the observation time of a spectral resolution element is increased. This is in direct contract to sinusoidal-type wavelength scans. FIG. 4C indicates the output signal as the background corrector operates during one cycle. It can readily be seen that there is distinct separation between the spectral background and the line of interest, i.e., the center line. As stated hereinbefore, this signal may be collected, stored and processed by a computer.

FIGS. 5 and 6 are representations of photographs taken from the face of an oscilloscope and represent the output of the background corrector arrangement illustrated in FIG. 2, wherein the spectral lines are derived from a chromium hollow cathode. FIG. 5A indicates the repetition of several cycles of the scan showing the continuous nature of that wavelength modulation. FIG. 5B shows only one scan in large detail. The fuzziness of the lines is an indication of the actual shot noise in the spectrometric system. The oscilloscope time base readout of 5 milliseconds in both FIGS. 5A and 5B indicates that the system is operating at two different scan rates, specifically 45 Hz in 5A and 25 Hz in 5B. This shows operation at different scan frequencies.

FIG. 6 illustrates the spectral alignment data that is available from the wavelength scan figures. When the scan trace is centered on the screen, the middle peak is exactly in the center of FIGS. 6A and 6B. This characteristic can be used in data reduction to determine the amount of spectral misalignment and provide a suitable correction for it through recalibration in the computer. In the case illustrated, the center peak is the one of interest. It should be noted that the center peak is symmetrically located in the middle of the scan trace when the system is in proper spectral alignment.

Repetitive scanning for background correction, as provided via the within invention, offers several advantages. For example, the scan allows the spectral background on both sides of the spectral line to be measured for several angstroms of wavelength. This feature allows for corrections to a changing background. Secondly, the scan collects the signal of interest for about one-half the observation time. This allows for high precision integration. Thirdly, the non-sinusoidal scan rate is advantageous because the region of greatest interest is scanned the slowest and is thus observed for the longest time. Fourthly, the position of the spectral line during the scan can be used as a sensitive check of the spectral alignment of the spectrometer. Fifthly, the recorded data allow corroboration of spectral line identity and intensity through use of the particular spectral signature of a trace substance of interest. Lastly, because the refractor plane is located behind the entrance slit the entire system is applicable to a multichannel instrument.

I claim:

1. In an emission spectrometer arrangement for determining the amount of one or more trace substances of interest in a biological sample and having means providing dynamic background correction with each wavelength of interest of the electromagnetic radiation spectrum, the improvement comprising first means receiving a collected electromagnetic radiation emission beam derived from the sample for determining the intensity of said beam over at least one preselected range of the electromagnetic spectrum, said first means including a rotatable refractor plate which is mounted off-axis with respect to the beam whereby the plate will move into and out of the path of the beam while rotating at a constant angular velocity, said first means receiving said beam during the period the plate is in and out of the path of the beam.

2. An arrangement according to claim 1 wherein said refractor plate is rotatably mounted to intercept the collected emissions through at least 90° and less than 180° of a rotation cycle thereof.

3. An arrangement according to claim 2 wherein said first means includes data processing means and wherein said plate and said data processing means are synchronized based on the instantaneous angular position of said refractor plate relative to the collected emission beam.

4. An arrangement according to claim 3 including means for performing said optical scan for a plurality of preselected ranges of the spectrum simultaneously.

5. In a process for correcting spectral background encountered when conducting a spectral analysis of a sample, such as biological sample, for trace amounts of certain substances, such as a toxic metals, the steps comprising:
   (a) introducing the sample suitably prepared into a spectrochemical emission electromagnetic radiation generating arrangement;
   (b) collecting at least some of the generated radiation by an optical system;
   (c) directing the collected radiation beam through a rotating refracting means which is off-axis with respect to the path of the beam whereby the rotating refracting means will move in and out of the path of said beam;
   (d) analyzing the output of said refracting means with an emission spectrometer arrangement to provide a plurality of outputs in electrical signal form, each representative of a particular trace substance of interest contained in the sample;
   (e) further analyzing the collected radiation beam when the refracting means is out of the path of said beam with said emission spectrometer arrangement; and
   (f) processing said electrical signals in synchronism with said refracting means to determine the amount of each of said trace substances of interest.

6. A process according to claim 5 wherein the variation in refraction of the beam is periodic and corresponds to a substantially continuous, non-sinusoidally changing displacements of the collected emissions as a function of time during each period, the rate of which displacement relative to the spectrometer arrangement is at a minimum with respect to those wavelengths associated to respective spectral lines of the trace substances of interest.

7. A process according to claim 6 which includes rotating the refracting means at constant velocity and the refracting means is a refractor plate.

* * * * *